UNITED STATES PATENT OFFICE.

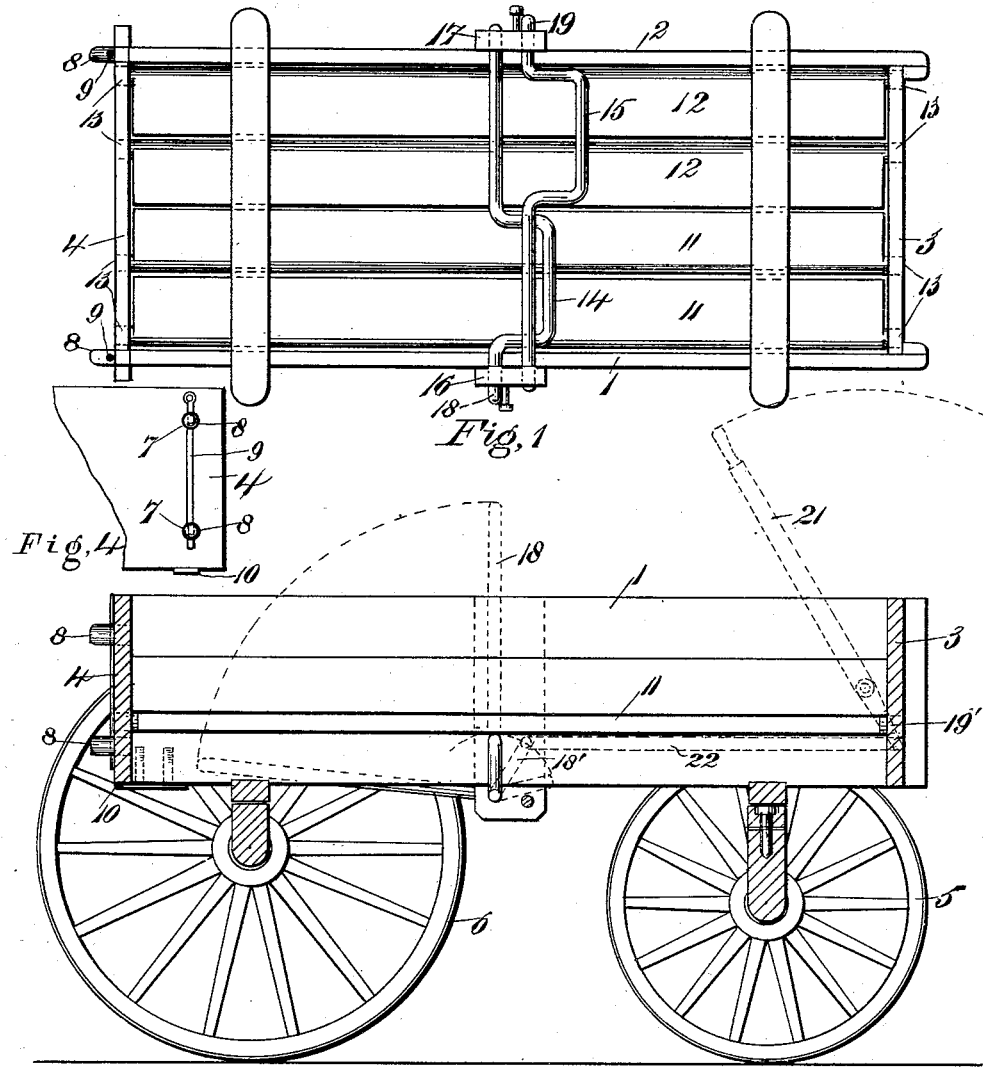

JAMES M. E. CAMPBELL, OF NEW PALESTINE, AND ROBERT P. RANKIN, OF CLAYTON, INDIANA.

DUMPING-WAGON.

SPECIFICATION forming part of Letters Patent No. 484,491, dated October 18, 1892.

Application filed April 20, 1892. Serial No. 429,983. (No model.)

*To all whom it may concern:*

Be it known that we, JAMES M. E. CAMPBELL, residing at New Palestine, in the county of Hancock, and ROBERT P. RANKIN, residing at Clayton, in the county of Hendricks and State of Indiana, citizens of the United States, have invented new and useful Improvements in Wagon-Bodies, of which the following is a specification.

Our invention relates to improvements in wagon-beds; and it consists in novel means for dumping or unloading the material contained therein, and is particularly designed for the transportation of gravel or other finely-divided non-cohesive material.

The object of our invention is to provide a means of unloading or dumping material, whereby the finer particles thereof will be permitted to escape and the larger or coarser particles, as bowlders, rocks, &c., will be retained in the wagon; also, to provide means whereby the operation of unloading or dumping will be rapidly accomplished and without the application of means for tilting the body of the wagon; also, to provide means whereby a portion or all of the material contained in the wagon may be unloaded from either side of the bottom of the wagon. We attain these objects by means of the mechanism illustrated in the accompanying drawings, in which—

Figure 1 is an inverted plan of our wagon-bed, showing the raising and lowering cranks of the pivotal slats in their lower position. Fig. 2 is a longitudinal section of the same through the line A B. (See Figs. 1 and 3.) Fig. 3 is a transverse sectional elevation through the line C D. (See Figs. 1 and 2.) Fig. 4 is a part end elevation showing the removable end or end-gate of the bed, and Fig. 5 is a detail perspective view of the pivotal end of the slats of the wagon-bed.

Similar numbers of reference designate like parts throughout the several views.

The body of the wagon, of which 1 and 2 are the sides and 3 and 4 are the ends, which are either firmly or removably secured together, is mounted on suitable rear and forward wheels 5 and 6 in the usual manner peculiar to this class of vehicles. The rear end or back 4 of the body of the wagon is preferably made removable for this purpose. We provide the upper and lower apertures 7, formed in said removable end at or near the ends thereof and adapted to receive the dowel-pins 8, formed on the ends of the sides 1 and 2, and it is held in position thereon by the securing-rods 9, passing through suitable end holes formed in said dowel-pins. We also provide the plates 10, which are preferably of iron or other suitable metallic substance and provided for the purpose of supporting said end piece 4 and relieving the dowel-pins 8 of any undue or downward stress when the wagon is loaded.

The bottom or bed of the body of the wagon is constructed of a series of slats 11 and 12, arranged longitudinally therein and having their pivotal ends or trunnions 13 formed integral on the ends thereof and at or near one of the edges thereof, as clearly shown in Fig. 5, and are pivoted in the ends 3 and 4, as shown more particularly in Figs. 2 and 3. It is clear that the slats 11 and 12, owing to their pivotal points being placed at one side of their centers, will swing downwardly by gravity to open, as shown in dotted lines in Fig. 3. For the purpose of retaining said slats closed, as shown in full lines more clearly in Fig. 3, we provide the retaining cranks or props 14 and 15, journaled in the side battens 16 and 17, firmly or removably secured on the sides 1 and 2 of the body of the wagon intermediate between the ends thereof, said cranks having one of their ends prolonged at opposite sides of the wagon and bent in the form of levers 18 and 19, as shown in Fig. 2, for the purpose of operating said crank-props 14 and 15 to close them or to cause them to disengage said slots to permit them to open by gravity or automatically.

When it is desirable to operate the dumping-slats of the bed of the wagon from the driver's seat or from a position in front of the vehicle and during the motion of the latter, we provide the hand-levers 20 and 21, pivoted on the sides 1 and 2 and connected in any suitable manner to the levers 18' and 19' by means of the connecting-rods 22, which mechanism forms a convenient means for controlling the openings of the slats by the driver and enables him to evenly distribute the material over a given surface, as is often required in road construction and repairs.

Any number of slats may be used in the construction of this class of wagon-bed; but when it is required to dump a third or a half of the load an uneven number of slats will be required to give a suitably-diminished proportion of opening, as the case may demand.

Having thus fully described the construction and operation of our invention, what we claim as novel and useful, and desire to cover by Letters Patent of the United States therefor, is—

The combination, with a wagon-body provided with a bottom consisting of slats 11 and 12, pivoted out of center and adapted to swing downwardly in opposite directions, of two separate crank-shafts supported by the wagon sides and provided with cranks adapted to operate the said slats 11 and 12, respectively, the said crank of each crank-shaft being arranged opposite the straight portion of the other crank-shaft, whereby the said slats are operated separately or simultaneously, substantially as set forth.

In testimony whereof we have hereunto set our hands in the presence of two subscribing witnesses.

JAMES M. E. CAMPBELL.
ROBERT P. RANKIN.

Witnesses:
THOMPSON R. BELL,
JNO. GEO. SMITH.